United States Patent Office 2,891,930
Patented June 23, 1959

2,891,930

FIBER-FORMING POLYESTERS FROM TRANS-1,4-CYCLOHEXANEDICARBOXYLIC COMPOUNDS AND 1,1-CYCLOHEXANE DIMETHANOL

John R. Caldwell and Russell Gilkey, Kingsport, Tenn., assignors to Eastman Kodak Company, Rochester, N.Y., a corporation of New Jersey No Drawing. Application March 25, 1957
Serial No. 647,957

1 Claim. (Cl. 260—75)

This invention relates to highly polymeric high-melting linear polyesters which are film-forming, crystalline, exhibit the property of cold drawing, and can be converted into biaxially oriented films and strong elastic fibers by the usual melt spinning and drafting procedures.

These polyesters are derived primarily from trans 1,4-cyclohexanedicarboxylic acid condensed with 1,1-cyclohexanedimethanol. These polyesters have value as molding plastics which can be fabricated by the usual injection, compression and extrusion process. These polyesters are particularly valuable when extruded, quenched, drafted and heat set. Films which have been so prepared are of particular utility as wrapping materials and are also useful as photographic film base materials. Fibers can be prepared which are valuable in the preparation of yarns, threads, etc. which can be formed into both woven and unwoven fabrics having specialized chemical and physical characteristics.

According to the prior art the tetramethylene and hexamethylene glycol polyesters of terephthalic acid melt at 225° C. and 155° C. respectively. In contrast, polyesters of trans-1,4-cyclohexanedicarboxylic acid with tetramethylene and hexamethylene glycols melt at about 160° C. and 115° C. respectively. In view of the higher melting point of the terephthalic polyesters, it is surprising to find conversely that the neopentyl glycol polyester of trans-1,4-cyclohexanedicarboxylic acid melts higher than that of the terephthalic acid polyester corresponding thereto. Thus, the polyester derived from terephthalic acid and neopentyl glycol melts at about 140° C. whereas the polyester from trans-1,4-cyclohexanedicarboxylic acid and neopentyl glycol melts at about close to 200° C. This is even more unexpected since Hill in "Fibers From Synthetic Polymers," page 151, published by Elsevier, 1953, states that polyesters from trans-1,4-cyclohexanedicarboxylic acid tend to be low melting and noncrystalline. In direct contrast, the trans-1,4-cyclohexanedicarboxylic acid polyesters encompassed by the present invention are quite crystalline and have a satisfactorily high melting point, especially as regards the preparation of films and molded objects. Moreover, the melting point is sufficiently high for fibers having special utility.

In another disclosure in the prior art there is a description of polyesters derived from trans-1,4-cyclohexanedicarboxylic acids condensed with cis-quinitol which melt at 125° C. and the isomeric polyesters formed from trans-quinitol which melt at about 300° C. However, these polyesters have very poor fiber and film-forming properties and cannot be compared with those of the instant invention which possess a desirable combination of valuable properties useful in particular for the preparation of films having unusual electrical characteristics and resistance to adverse effects resulting from high humidity and other moisture effects and weathering conditions.

It is an object of this invention to provide novel polyesters derived from trans 1,4-cyclohexanedicarboxylic acid and 1,1-cyclohexanedimethanol.

It is a further object of this invention to provide films, fibers and molded objects which can be produced from such polyesters and possess many outstanding physical, chemical and electrical properties.

It is an additional object to provide film from these novel polyesters which is extremely resistant to weathering and can be used as a superior wrapping material under adverse conditions of moisture and/or humidity for prolonged periods.

It is another object to provide such film characterized by unexpectedly high dielectric strength whereby electrical components can be made which are smaller in size than heretofore practical and which stand up under hot, humid and moist weather conditions.

It is a still further object to provide a new, useful and unobvious combination of polyester components, namely

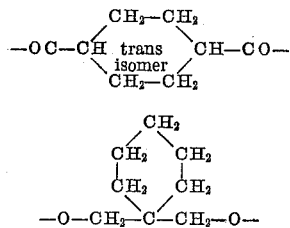

and which combination occurring together in the recurring units of polyester molecules results in the new, useful and unobvious combination of properties possessed by the fibers, film and molding compositions provided by this invention.

Additional objects are apparent elsewhere in this specification.

These and other objects can be accomplished by an embodiment of the invention which provides in a linear highly polymeric fiber and film-forming polyester essentially composed of recurring ester units formed as a result of the condensation of 1.0 mole proportion of a dicarboxy compound and 1.0 mole proportion of a glycol, the improvement which consists essentially of having said recurring ester units formed as a result of (1) employing as said dicarboxy compound from 0.7 up to 1.0 mole proportion of trans-1,4-cyclohexanedicarboxylic compound and (2) employing as said glycol 0.7 to 1.0 mole proportion of a member selected from the group consisting of 1,1-cyclohexanedimethanol and 2,2-dimethyl-1,3-propanediol, which polyester is characterized in that it can be extruded and quenched to form film which can be tentered and heat set and possesses useful chemical, physical and electrical properties including a high dielectric constant and hydrolytic stability.

The processes which can be employed to prepare the novel polyesters of this invention do not differ substantially from those well known in the prior art for the preparation of high melting linear highly polymeric fiber and film-forming polyesters. Numerous patents describe the preparation of such polyesters, for example, U.S. 2,720,502 through 2,720,507 describe the preparation of such polyesters. The techniques described therein and in many other U.S. patents can be employed for the preparation of the polyesters contemplated under this invention involving the condensation of trans-1,4-cyclohexanedicarboxylic acid with the substituted propane-1,3-diols. Modifying bifunctional dicarboxylic acids or glycols can be incorporated during the preparation of these polyesters and may be desirable under certain circumstances to alter the physical and chemical characteristics of the resultant polyester to fit some special situation as when a broader temperature range might be desirable in injection molding operations. The employment of modifiers in such polyesters for accomplishing modifications in physical and chemical characteristics is well known in the art.

Thus, a further embodiment of this invention provides in a process for preparing a high-melting, highly polymeric linear fiber and film-forming polyester by condensing at an elevated temperature 1.0 mole proportion of a dicarboxy compound with at least 1.0 mole proportion of a glycolic compound under highly polymeric linear polyester forming conditions, the improvement which consists essentially of (1) employing as said dicarboxy compound from 0.7 up to 1.0 mole proportion of a trans-1,4-cyclohexanedicarboxylic compound and (2) employing as said glycol at least 0.7 up to 1.0 or more of a glycol selected from the group consisting of 1,1-cyclohexanedimethanol and 2,2-dimethyl-1,3-propanediol, which polyester is characterized (A) by having a melting point of at least 180° C., (B) in that it can be extruded, quenched, tentered and heat-set to form films which show a crystalline structure and which retain useful chemical, physical and electrical properties when exposed in saturated water vapor at 110° C. for 96 hours without substantial reduction in the inherent viscosity of the polyester.

The following example will serve to further illustrate the practice of this aspect of the invention:

EXAMPLE 1

A mixture of 8.6 g. (0.05 mole) of trans-1,4-cyclohexanedicarboxylic acid and 15 g. (0.14 mole) of 2,2-dimethyltrimethylene glycol were placed in a reaction vessel equipped with a stirrer, a distillation column, and an inlet for purified nitrogen. The reaction mixture was heated at 180° C. with stirring until a homogeneous solution was obtained. The temperature was then raised to 200° C. and heating was continued for 30 minutes. At this point the water of esterification had distilled out. A solution of 0.01 g. titanium tetrabutoxide in 1.0 ml. of butyl alcohol was added and the temperature was raised to 220° C. and held for 10 minutes. A vacuum of 0.2 mm. was applied. After 5 hours of stirring under vacuum, a viscous melt was obtained. The inherent viscosity of the polyester, as determined in a solution of 60 phenol–40 tetrachloroethane, was 0.71. Determination of the crystalline melting point on the hot stage of a microscope under crossed Nicols gave a value of 196–199° C. An X-ray diffraction pattern indicated that the polymer was quite crystalline. It was soluble in methylene and ethylene dichloride. The polymer was very resistant to hydrolysis.

This polyester is valuable for the production of film and fibers by the melt extrusion process. Films can also be cast from a volatile solvent. It is especially useful as a molding plastic.

EXAMPLE 2

A mixture of 100 g. (0.5 mole) of trans-1,4-cyclohexanedicarboxylic acid, dimethyl ester, and 104 g. (1.0 mole) of 2,2-dimethyl-1,3-propylene glycol was placed in a reaction vsesel as in Example 1. An ester interchange catalyst, 0.1 g. dibutyl diphenyl tin in 5 ml. of butyl alcohol, was added to the reaction mixture. The ester interchange reaction was carried out at 220° C., and the evolved methanol was removed by distillation. The temperature was then raised to 250° C. and held for 10 minutes. A vacuum of 0.5 mm. was applied. After the excess glycol had been removed by distillation, the vacuum was broken to nitrogen, and 0.05 g. of magnesium titanium butoxide was added. Vacuum was again applied and the reaction mixture was heated and stirred at 250° C. for 3 hours. A very viscous melt having a light amber color was obtained. The inherent viscosity of this polymer was 0.98. It had essentially the same properties as the product in Example 1.

EXAMPLE 3

The procedure described in Example 1 was repeated exactly except that the neopentyl glycol was entirely replaced with 1,1-cyclohexanedimethanol. The polyester produced was crystalline and melted at 182–190° C. It was very stable toward hydrolysis and retained substantially all of its original inherent viscosity after being exposed to saturated water vapor at 110° C. for 4 days. It had a dielectric constant of 4.2 to 5.0 over the range of 40°–70° C. at 1000 cycles.

The dielectric properties of the polyesters made in accordance with the three preceding examples from trans-1,4-cyclohexanedicarboxylic acid and the substituted propane-1,3-diols are especially valuable. It is well known that a high dielectric constant is very desirable because thin films having good insulating power can be made. The dielectric constants for several polyesters are given below for comparative purposes:

Table I

| Polyester Components | Dielectric Constant at 1,000 Cycles | | | |
|---|---|---|---|---|
| | 40° C. | 50° C. | 60° C. | 70° C. |
| A. Trans 1,4-cyclohexanedicarboxylic acid+NPG* | 4.6 | 5.0 | 5.4 | 5.0 |
| B. Terephthalic acid+NPG* | 3.2 | 3.2 | 3.2 | 3.2 |
| C. Terephthalic acid+ethylene glycol | 3.2 | 3.2 | 3.2 | 3.2 |

*NPG is neopentyl glycol.

From the data it can be seen that the polyester made from trans-1,4-cyclohexanedicarboxylic acid and neopentyl glycol has a much higher dielectric constant than the previously known analogous polyester made with terephthalic acid. Moreover, it was surprising to find that the polyester also has a much higher dielectric constant than polyethylene terephthalate. It is well known that films of polyethylene terephthalate are of great practical importance in the manufacture of capacitors, etc., because of their high dielectric constant. It is thus apparent that the products of the present aspect of the invention represent a significant contribution to the art because they have a higher dielectric constant than what has generally been considered to be the best organic insulating film previously known.

Another quite important property of polyester fibers and films is the resistance to hydrolysis. It has been found that the polyesters of the present invention are very resistant to hydrolysis and, in fact, are superior to commercial polyesters such as polyethylene terephthalate. This is surprising because it is well known that aliphatic polyesters, in general, hydrolyze very easily. Comparative hydrolysis rates are given in the table below. The hydrolysis test was carried out by heating a film of the polyester in saturated water vapor at 110° C. for 4 days. Measurements were then made of the inherent viscosity retained after this treatment. The percent of the original inherent viscosity which was retained is shown in the table.

Table II

| Polyester Components | Inherent Viscosity Retained, percent |
|---|---|
| A. Trans 1,4-cyclohexanedicarboxylic acid+NPG | 100 |
| B. Terephthalic acid+ethylene glycol | 60 |
| C. Sebacic acid+1,5-pentanediol | 10–20 |

From the above data it can be seen that the polyester made from trans-1,4-cyclohexanedicarboxylic acid and neopentyl glycol is considerably more resistant to hydrolysis than polyethylene terephthalate. This is all the more surprising because the related aliphatic polyester made from a straight-chain acid and straight chain glycol as shown in item C of Table II was almost completely hydrolyzed under similar conditions. It is thus apparent that the products of the invention are much more stable than would be predicted from the aliphatic structure.

The properties of the polyesters of this invention derived from 1,1-cyclohexanedimethanol are especially surprising and unexpected. The lack of symmetry of this structure would lead one skilled in the art to predict non-crystalline polyesters of low melting points. The properties discovered were most unobvious in all respects. These polyesters are not mere equivalents of those derived from neopentyl glycol since their differences in structure were such that an important feature of this invention resides in the discovery that both polyesters possess closely related characteristics of great value.

The polyester made from trans-1,4-cyclohexanedicarboxylic acid and trans-1,4-cyclohexanedimethanol has a similar high resistance to hydrolysis. Example 46 of C. J. Kibler et al., application Ser. No. 554,639, filed December 22, 1955, describes polyesters derived from a mixture of glycols including 40 percent of neopentyl glycol and 60 percent of 1,4-cyclohexanedimethanol (75 percent trans isomer) condensed with terephthalic acid. Other examples in the Kibler et al. application describe polyesters involving the employment of hexahydroterephthalic acid (trans isomer) which is another name for 1,4-cyclohexanedicarboxylic acid. The condensation of trans-1,4-cyclohexanedicarboxylic acid with 1,4-cyclohexanedimethanol produces polyesters having exceptionally valuable properties which are equivalent in some regards to the polyesters contemplated within the present aspect of this invention. Thus, a mixture of 100 grams (0.5 mole) of trans-1,4-cyclohexanedicarboxylic acid as its dimethyl ester and 101 grams (0.7 mole) of 1,4-cyclohexanedimethanol (70–80 percent trans isomer) can be condensed as indicated in the processes described in the above examples. In one particular process the heating under the vacuum was interrupted after 25 minutes at 260° C. and the polymer was solidified, pulverized and the powdered prepolymer was then heated with stiring at 235° C. under a vacuum so as to produce a white product having an inherent viscosity of 0.82 and a melting point of 245–251° C. This polyester was quite crystalline and was extruded to form fibers and films and was also used as a molding plastic. It was found especially valuable in fibers and films since it can be easily oriented and heat set to give finished materials of high softening point and excellent physical properties, including resistance to hydrolysis.

Another special glycol which produces polyesters having valuable properties similar in some respects but not necessarily equivalent to those in the present invention is p-xylylene glycol. A polymer prepared from trans-1,4-cyclohexanedicarboxylic acid and p-xylylene glycol (also called p-xylylene-α,α'-diol) by the methods described hereinabove produced a polymer having an inherent viscosity of 0.57, a softening point range of 250–275° C., and excellent utility in the manufacture of film, fibers and molded articles having exceptional resistance to hydrolysis among other valuable properties.

Other valuable gem-dialkyl glycols which are homologous with those of the preferred embodiment of this invention (neopentyl glycol) include 2,2 - dimethyltetramethylene glycol, 2,2,3,3 - tetramethylenetetramethylene glycol, etc. Of course, other homologous glycols can be similarly employed. However, neopentyl glycol serves to produce the preferred polyesters of this invention having the most generally valuable combination of worthwhile characteristics including high melting point, exceptional resistance to hydrolysis, high dielectric constants, and other valuable physical, chemical and electrical properties. Of course, the use of 1,1-cyclohexanedimethanol also serves to produce preferred polyesters possessing unobvious properties, but this glycol is not a gem-dialkyl glycol although it is a substituted 1,3-propanediol. As clearly shown hereinabove, the polyesters produced from these two distinct glycol structures are not mere equivalents.

In the claims and the above description neopentyl glycol is sometimes referred to by other names for this same compound, i.e. 2,2-dimethyl-1,3-propanediol, or 2,2-dimethyl-1,3-propylene glycol, or 2,2-dimethyltrimethylene glycol.

Although the invention has been described in considerable detail with reference to certain preferred embodiments thereof, it will be understood that variations and modifications can be effected without departing from the spirit and scope of the invention as described hereinabove and as defined in the appended claim.

We claim:

A linear highly polymeric fiber and film forming polyester consisting essentially of recurring units having the formula:

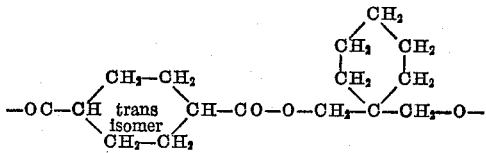

which polyester is characterized (A) by having a melting point of 182–190° C., (B) by being highly crystalline as indicated by X-ray defraction patterns, and capable of being extruded, quenched, biaxially oriented and heat set to form films of especially valuable chemical, physical and electrical characteristics, including a dielectric constant at 1,000 cycles in a temperature range of 40–70° C. of from 4.2 to about 5.0 and excellent resistance to hydrolytic deterioration as evidenced by ability to withstand heating the polyester film in saturated water vapor at 110° C. for 96 hours without significant reduction in the inherent viscosity of the polyester.

References Cited in the file of this patent

FOREIGN PATENTS 588,833   Great Britain ------------ June 4, 1947